United States Patent
Matt et al.

(10) Patent No.: US 11,140,815 B2
(45) Date of Patent: Oct. 12, 2021

(54) METHOD FOR OPERATING A SYSTEM OF SELF-DRIVING GROUND WORKING DEVICES

(71) Applicant: Andreas Stihl AG & Co. KG, Waiblingen (DE)

(72) Inventors: Sebastian Matt, Kufstein (AT); Samuel Zoettl, Birgitz (AT); Christian Horngacher, Kirchberg in Tirol (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/957,771

(22) Filed: Apr. 19, 2018

(65) Prior Publication Data
US 2018/0303028 A1    Oct. 25, 2018

(30) Foreign Application Priority Data
Apr. 19, 2017    (DE) ...................... 10 2017 003 735.3

(51) Int. Cl.
*A01D 34/00*    (2006.01)
*G05D 1/02*    (2020.01)
(Continued)

(52) U.S. Cl.
CPC ........... *A01D 34/008* (2013.01); *A01D 34/64* (2013.01); *G05D 1/0016* (2013.01);
(Continued)

(58) Field of Classification Search
CPC .. A01D 34/008; A01D 34/64; A01D 2101/00; A01D 69/02; G05D 1/0297;
(Continued)

(56) References Cited

U.S. PATENT DOCUMENTS

| | | | |
|---|---|---|---|
| 9,008,839 B1* | 4/2015 | Kuffner, Jr. ............ | B25J 9/0084 700/248 |
| 2011/0202307 A1* | 8/2011 | Petereit ................ | A01D 34/008 702/150 |
| 2015/0289743 A1 | 10/2015 | Taoka et al. | |

FOREIGN PATENT DOCUMENTS

| DE | 202013101894 U1 | 8/2014 |
|---|---|---|
| DE | 102015114568 A1 | 3/2017 |

(Continued)

OTHER PUBLICATIONS

Blender, Tima et al: "Managing a Mobile Agricultural Robot Swarm for a Seeding Task", IECON 2016—42nd Annual Conference of the IEEE Industrial Electronics Society, IEEE, Oct. 23, 2016, pp. 6879 to 6886, XP033033840, DOI: 10.1109/IECON.2016.7793638.

*Primary Examiner* — Yuen Wong
(74) *Attorney, Agent, or Firm* — Walter Ottesen, P.A.

(57) ABSTRACT

A system (S) has at least a first and a second self-driving ground working device for combined working of a predetermined operating region (A). An individual ground working device travels autonomously along a random path inside the operating region. The system has at least one base station for communication with the ground working devices. For a method for setting up and operating the system, provision is made that information relating to an operating variable (B) stored in one ground working device is transmitted to further ground working devices, that a ground working device travels autonomously along a random path (W) inside the operating region, independently of another ground working device, by using the operating variable, and that during the operation of the system of ground working devices the behavior of an individual ground working device is adapted as a function of changes in the operating variable.

13 Claims, 2 Drawing Sheets

(51) Int. Cl.
  *A01D 34/64* (2006.01)
  *G05D 1/00* (2006.01)
  *A01D 69/02* (2006.01)
  *A01D 101/00* (2006.01)

(52) U.S. Cl.
  CPC ......... *G05D 1/0022* (2013.01); *G05D 1/0027* (2013.01); *G05D 1/0265* (2013.01); *G05D 1/0276* (2013.01); *G05D 1/0287* (2013.01); *G05D 1/0297* (2013.01); *A01D 69/02* (2013.01); *A01D 2101/00* (2013.01); *G05D 2201/0208* (2013.01)

(58) Field of Classification Search
  CPC .. G05D 1/0265; G05D 1/0287; G05D 1/0276; G05D 1/0027; G05D 1/0022; G05D 1/0016; G05D 2201/0208; G05D 2201/0201; G05D 1/0285; G05D 1/028; G05D 1/0278; G05D 1/0259; G05D 1/0214
  See application file for complete search history.

(56) References Cited

FOREIGN PATENT DOCUMENTS

| | | | | |
|---|---|---|---|---|
| DE | 202013101894 A1 * | 3/2017 | ........... | G05D 1/0297 |
| EP | 2631731 A2 | 8/2013 | | |

\* cited by examiner

METHOD FOR OPERATING A SYSTEM OF SELF-DRIVING GROUND WORKING DEVICES

CROSS REFERENCE TO RELATED APPLICATION

This application claims priority of German patent application no. 10 2017 003 735.3, filed Apr. 19, 2017, the entire content of which is incorporated herein by reference.

FIELD OF THE INVENTION

The invention relates to a method for setting up and operating a system having at least a first and a second self-driving ground working device for combined working of a predetermined operating region. An individual ground working device travels autonomously along a random path inside the operating region, to which end each ground working device has its own drive, its own control unit and an in-device battery for the power supply. The control unit of a ground working device comprises a memory for at least one operating variable, the system having at least one base station for communication with the ground working devices.

BACKGROUND OF THE INVENTION

Self-driving battery-operated ground working devices are known, for example, as so-called robotic mowers. The operating region of such a robotic mower may, for example, be bounded by an edge boundary wire which forms a closed wire loop, the ends of which are connected to a transmitter unit. The transmitter unit transmits signals with a predetermined frequency or shape onto the edge boundary wire, the signals being received by a receiver unit in the robotic mower and evaluated. Via the wire signals on the edge boundary wire, the robotic mower can detect whether it is traveling inside or outside the operating region enclosed by the edge boundary wire.

DE 20 2013 101 894 U1 discloses a system consisting of a plurality of robotic mowers, which work a predetermined common operating region. The setting up and the operation of such a system consisting of a plurality of robotic mowers for an operating region are very time-consuming. When problems occur, the user must intervene in order to ensure operation of the system.

SUMMARY OF THE INVENTION

It is an object of the invention to provide a method for setting up and operating a system having a plurality of ground working devices, which is simple to set up and reduces interventions by a user during operation.

In a method for setting up and operating a system having at least a first and a second self-driving ground working device for combined working of a predetermined operating region, wherein an individual ground working device travels autonomously along a random path inside the operating region, and each ground working device has a drive, a control unit and an in-device battery for the power supply of the ground working device, and each control unit of a ground working device comprises a memory for at least one operating variable, wherein the system has at least one base station for communication with the ground working devices, the object is achieved in that in order to set up and put in operation the system having a plurality of ground working devices, information relating to an operating variable stored in one ground working device is transmitted to further ground working devices, in that a ground working device travels autonomously along a random path inside the operating region, independently of another ground working device, by using the operating variable, and in that during the operation of the system of ground working devices the behavior of an individual ground working device is adapted as a function of changes in the operating variable.

The information relating to an operating variable stored in a ground working device, which is required for setting up and putting in operation the system of a plurality of ground working devices, is transmitted automatically by the system to further ground working devices. A ground working device will autonomously travel along a random path inside the operating region independently of another ground working device by using the operating variable. During operation of the system, furthermore, the behavior of an individual ground working device is adapted as a function of changes in the operating variable which the base station newly transmits to all the ground working devices.

In order to set up the system, the user needs to enter the information about the operating variable, in particular for only one ground working device, only once. The system itself will distribute the information about the entered operating variable, or the operating variable itself, to all further ground working devices of the system. The user needs to establish the information about the operating variable only once independently of the number of ground working devices in the system.

In order to reduce the interventions by a user during operation of the system, provision is made to adapt the behavior of an individual ground working device as a function of changes in the operating variable. This modified operating variable may be determined by the base station and distributed to all ground working devices of the system.

In one simple embodiment of the method, the information about the operating variable is entered via an input field or input pad of a first ground working device. After the end of the input, this ground working device will transmit the information about the operating variable, or the operating variable itself, to the base station, in particular wirelessly. The base station will wirelessly distribute the information about the operating variable, or the operating variable itself, which has been entered on the first ground working device, to the other members of the system. The system is ready for operation.

In an alternative embodiment, the information about the operating variable may also be entered directly via an input field of the base station. Once the input of the information about the operating variable has been completed, this information is distributed by the base station to the individual ground working devices of the system. The information about the operating variable, or the operating variable itself, is advantageously stored in a memory of the respective ground working device of the system, and each ground working device is operated autonomously as a function of the operating variable.

In a further embodiment of the invention, provision may be made to carry out the setting up of the system having a plurality of ground working devices via an external input device. The external input device may for example be a mobile terminal, for example a smartphone, a tablet PC or a smartwatch, or a static input device, for example a PC. A user app is installed on the external input device, and this app guides the user in a straightforward way through the installation process of the system via the screen of the external input device. The user enters the data via an input field in the user app, for example on his smartphone or another external input device. The input field may, for example, be a touchscreen or a keypad. After the end of the input, the data are transmitted from the external input device, in particular wirelessly, to the base station, which distributes the operating variable to all ground working devices of the system. WLAN, NFC, Bluetooth, GSM or similar radio standards may be used for the data transmission.

The information items of the operating variable for the operation of a ground working device are respectively stored in a memory of a ground working device. The control unit of the ground working device will control and operate the ground working device autonomously, and independently of other ground working devices, as a function of the information items of the operating variable.

In an embodiment of the invention, the individual ground working devices report their respective current operating status to the base station. At all times, the base station therefore has knowledge of the operational readiness and the current operation of a ground working device. If, for example, a ground working device fails, for example because of low battery charge or a problem, this is reported to the base station by the affected ground working device. The base station identifies the failure and will adapt the current operating variable as a function of the failure and the reported operating statuses of the ground working devices. In particular, the information relating to the operating duration of the ground working devices may be adapted slightly when one of the ground working devices of the system fails. The operating outcome—for example full mowing of a lawn—may thus be achieved reliably by increasing the operating time of the remaining ground working devices without intervention by a user.

The operating variable adapted by the base station is transmitted, in particular wirelessly, to the individual ground working devices operating in the system, and stored in the respective memory of a ground working device for further processing by the control unit of the respective ground working device.

According to an embodiment of the invention, the operating region of the ground working devices is bounded by an edge boundary wire. It may be advantageous to carry out other ways of delimiting the operating region, for example using radio beacons, GPS navigation or by combination of such systems.

According to an embodiment, the base station of the system is electrically connected to the edge boundary wire and will transmit a wire signal onto the edge boundary wire. In a reception coil of the ground working device, the electromagnetic field of the wire signal induces a reception signal which is used for controlling the ground working device via the control unit.

In a preferred configuration of the invention, the ground working device is configured as a lawnmower.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
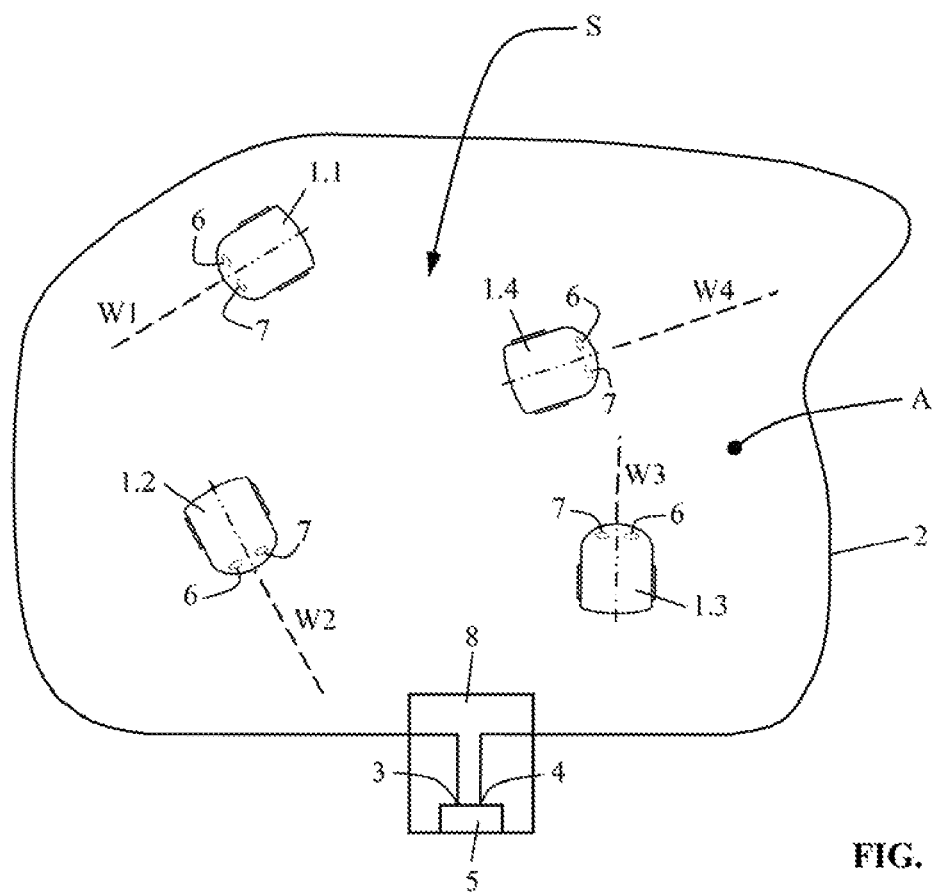
FIG. 1 is a schematic representation of a system having a plurality of self-driving ground working devices.

The system S represented in FIG. 1, including self-driving ground working devices, comprises in the embodiment four self-driving ground working devices 1.1, 1.2, 1.3 and 1.4 for combined working of a predetermined operating region A. Each individual ground working device 1.1, 1.2, 1.3, 1.4 operates autonomously and automatically travels autonomously along a random path W1, W2, W3 and W4 inside the operating region A.

In the shown embodiment according to FIG. 1, the operating region A of the ground working devices 1.1, 1.2, 1.3 and 1.4 is bounded by an edge boundary wire 2, on which electrical signals are sent. The edge boundary wire 2 is laid as a closed wire loop, the ends 3, 4 of the edge boundary wire 2 being connected to a transmission unit 5. The transmission unit 5 transmits—preferably at fixed time intervals—electrical signals on the edge boundary wire 2, and the signals are received by reception coils 6 and 7 of the ground working devices 1.1 to 1.4.

The transmission unit 5 is part of a base station 8 which communicates with the ground working devices 1.1, 1.2, 1.3 and 1.4. The communication between the base station 8 and the ground working devices may advantageously take place wirelessly via the loop of the edge boundary wire 2. A wireless communication connection between the base station 8 and the ground working devices 1.1 to 1.4, for example as a radio link or the like, is also advantageous. Possible radio links may be WLAN connections, Bluetooth connections, GSM connections, NFC connections or similar connections.

Figure 2:
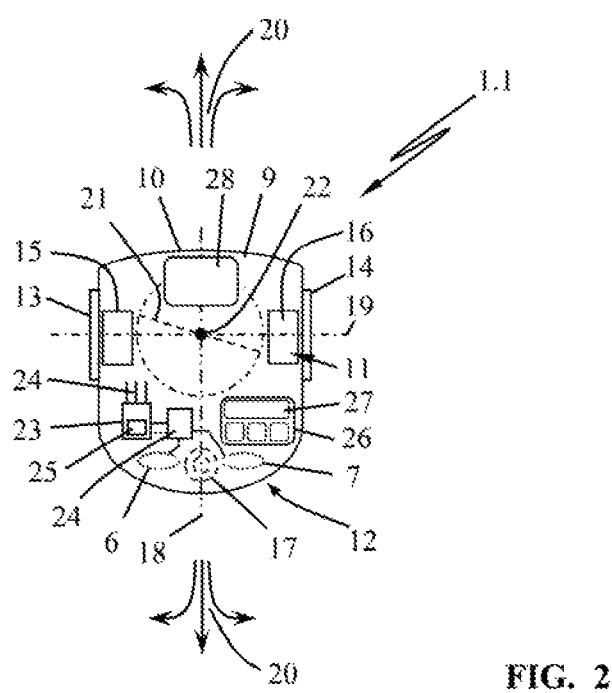
FIG. 2 is a schematic representation of the structure of a ground working device with reference to the example of a self-driving lawnmower.

FIG. 2 shows, in a schematic plan view, a ground working device 1.1 which is configured as a lawnmower 10. The representation of the autonomously operating self-driving lawnmower is exemplary; the ground working device may also be configured as a scarifier, road sweeper, vacuum cleaner, autonomous ride-on lawnmower, or similar ground working device.

The ground working device 1.1, representing a lawnmower 10, consists essentially of a chassis with rear drive wheels 13, 14 with a drive 11. In the embodiment shown, each drive wheel 13, 14 is assigned an electrical drive motor 15, 16. The drive 11 consists of two mutually independently controllable electric motors. Provided in the front region 12 of the housing 9, there is an in particular self-aligning third wheel 17. The third wheel 17 lies, in particular, on a longitudinal mid-axis 18 of the housing 9. The configuration of a chassis frame with four wheels may be expedient.

The drive wheels 13, 14 of the ground working device 1.1 which is shown rotate about a common drive axis 19. The drive axis 19—in the plan view according to FIG. 2—is in particular perpendicular to the longitudinal mid-axis 18 of the housing 9. For traveling in a straight line, the drive wheels 13 and 14 are to be driven synchronously via their electrical drive motors 15 and 16. For navigating a curve, the drive wheels 13, 14 are driven with different rotational speeds by their drive motors 15, 16. Via the drive, the ground working device 1.1 can be operated in any desired traveling direction 20 forward or backward.

In the embodiment as a lawnmower 10, the ground working device 1.1 has an operating tool 21 between the drive wheels 13 and 14. In the embodiment as a lawnmower 10, the operating tool 21 is a blade rotating about a vertical rotation axis 22.

The control of the electrical drive motors 15 and 16 is carried out via a control unit 23, which is connected via schematically indicated electrical lines 24 to the electrical drive motors 15 and 16.

The signal transmitted on the wire loop of the edge boundary wire 2 is received in the reception coils 6 and 7 of the ground working device 1.1, the reception coils 6 and 7 being arranged in the front region 12 of the housing 9, respectively on one side of the longitudinal mid-axis 18 of the ground working device 1.1. The signals of the reception coils 6 and 7 are delivered to a common evaluation unit 24, which is connected to the control unit 23. Advantageously, the control unit 23 comprises a memory 25 for an operating variable B, B' (FIGS. 3 and 4) which is expedient for operating the ground working device 1.1. Such an operating variable may for example be the start time of the operation, the duration of the operation, the cutting height (in the case of a configuration as a lawnmower), the traveling distance to a charging station, a mowing schedule as a weekly schedule, or the like.

In FIG. 2, for entering information about the operating variable B, an input field 26 is provided, which advantageously has a screen 27 and input keys. It may be expedient to configure the screen as a touchscreen, so that input keys may be omitted.

Electrical supply of the control unit 23 and of all its components, as well as of the electrical drive 11, is ensured by a battery 28, which is preferably inserted into the housing 9 of the ground working device 1.1.

As a result of corresponding control of the drive motors 15 and 16, the control unit 23 makes the ground working device 1.1 travel in the operating region A to be worked. Each ground working device 1.1, 1.2, 1.3 and 1.4 of the system S operates autonomously according to the information of the operating variable B, which is preferably stored in the memory 25 of each ground working device 1.1.

As FIG. 1 shows, each ground working device 1.1, 1.2, 1.3 and 1.4 travels along its own random path W1, W2, W3, W4. During operation, the information items of the communicated operating variable B are taken into account.

In order to set up and operate the system S having a plurality of ground working devices, in the shown embodiment of four ground working devices 1.1, 1.2, 1.3 and 1.4, according to a first embodiment, the information of the operating variable B is entered via the input field 26 on a first ground working device 1.1. This is shown schematically in FIG. 3. The entry E of all information for the operating variable B is carried out for example on the ground working device 1.1. The information relating to the operating variable B stored in the ground working device 1.1 is transmitted, in particular wirelessly, to the other ground working devices 1.2, 1.3 and 1.4. Each ground working device 1.1, 1.2, 1.3 and 1.4 is therefore ready for operation and travels inside the operating region A autonomously along a random path W1, W2, W3 and W4 independently of another ground working device by using the received operating variable B. During operation of the system S having the (in the example) four ground working devices 1.1, 1.2, 1.3 and 1.4, the behavior of an individual ground working device is adapted as a function of changes in the operating variable B. Expediently, the individual ground working devices 1.1, 1.2, 1.3 and 1.4 report their current operating status via an in particular wireless radio link 30 to the base station 8, which adapts the information relating to the operating variable B as a function of the reported operating statuses. This adapted operating variable B' is then communicated to all ground working devices 1.1, 1.2, 1.3 and 1.4 of the system S, so that further operation of the individual autonomously operating ground working devices 1.1, 1.2, 1.3 and 1.4 is carried out according to the adapted operating variable B'.

If for example a ground working device fails, for example because the battery needs to be charged, this ground working device reports an empty battery to the base station 8. The base station 8 may then adapt the current operating variable B in such a way that the desired operating outcome is still achieved in the intended time. If, for example in a system having self-driving lawnmowers, a lawnmower fails, the base station 8 will increase the mowing time of the remaining lawnmowers and transmit it as a modified operating variable B' to the individual lawnmowers.

Figure 3:
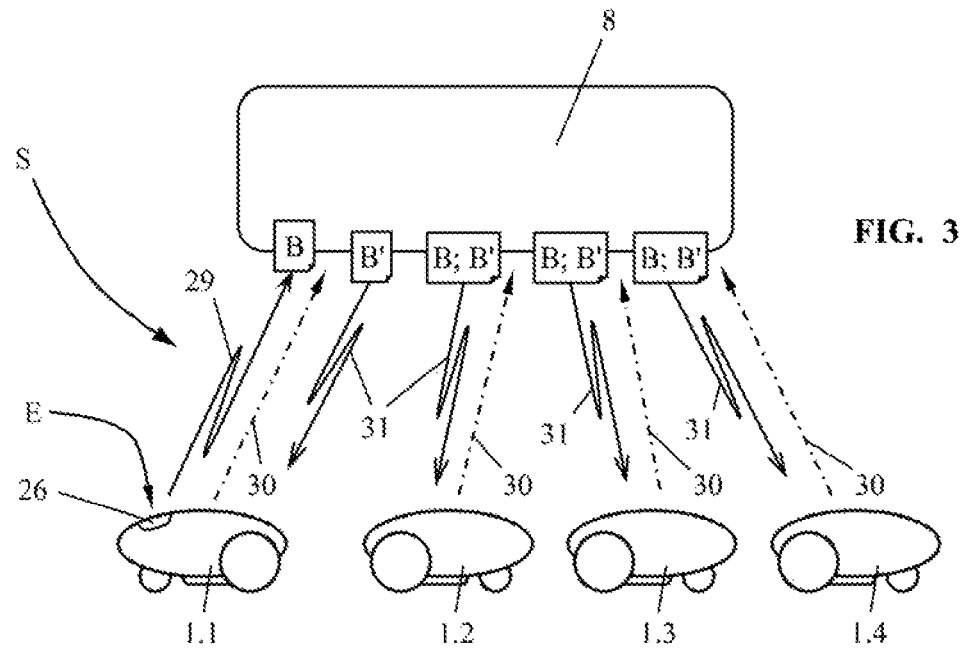
FIG. 3 is a schematic representation of the principle of the method for setting up and operating the system having a plurality of ground working devices; and, FIG. 4 is a schematic representation of the principle according to FIG. 3 in alternative embodiments.

Information items relating to the operating variable B may be entered in a straightforward way via the input field 26 of a ground working device 1.1 (FIG. 2). As FIG. 3 schematically shows, the entries E carried out into the input field 26 in the ground working device 1.1 are communicated wirelessly via a radio link 29 to the base station 8. The base station 8 forwards the entered information items relating to the operating variable B to the further ground working devices of the system S. To this end, the base station 8 is connected via wireless radio links 31 to the ground working devices 1.2, 1.3 and 1.4 of the system S.

Via the radio links 30, all ground working devices 1.1, 1.2, 1.3 and 1.4 report their operating status to the base station 8. The base station 8 monitors the system S and, if a ground working device fails, adapts the operating variable B to form an adapted operating variable B', which is then transmitted via the radio links 31 to all ground working devices of the team. The radio links 30 and 31 may be separate radio links with different radio protocols such as NFC, Bluetooth, WLAN, GSM or the like.

Figure 4:
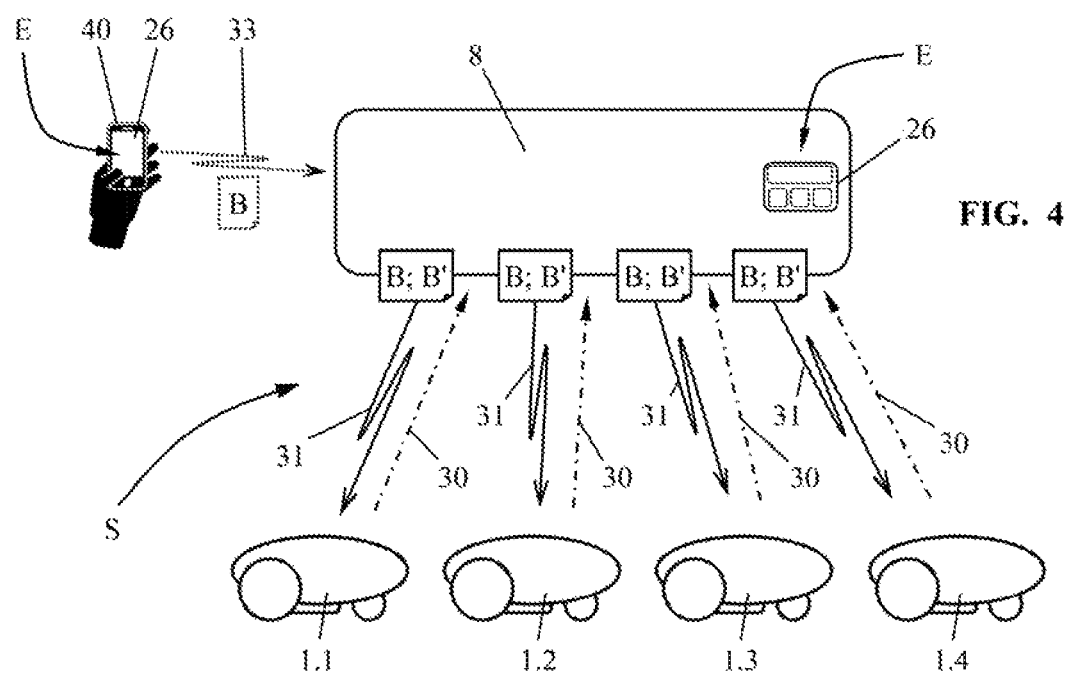

As represented in FIG. 4, it may be expedient to provide an input field 26 on the base station. The entries E of the information items relating to the operating variable of the ground working devices 1.1, 1.2, 1.3 and 1.4 of the system S are entered by the user on the input field 26 of the base station 8 and distributed via the radio links 31 to the members of the system S. The adaptation of the operating variable B to form an adapted operating variable B' and the distribution thereof to the individual ground working devices 1.1, 1.2, 1.3 and 1.4 of the system S are carried out in the same way as described with reference to FIG. 3 via a radio link 31.

It may be advantageous to enter the information items relating to the operating variable B via manual entry E on an external input device 40, for example a smartphone, as is represented by dots in FIG. 4. The external input device 40 communicates wirelessly with the base station 8 and transmits the information items relating to the operating variable which have been entered manually on the input device. The wireless radio link 33 between the input device 40 and the base station 8 may be a WLAN radio connection, a Bluetooth radio connection, an NFC (Near Field Communication) radio connection or similar wireless radio connection for transmitting data. The external input device 40 may be a mobile terminal, for example a tablet PC, a smartwatch, a smartphone or the like. As an alternative, the external input device 40 may also be a static input device, for example a PC. Other input devices 40 may also be advantageous. Stored in the external input device 40, there is a program, in particular a user app, via which the information items relating to the operating variable B can be entered. The entry may advantageously be carried out via an input field 26, for example a touchscreen or a keypad.

If—as represented in FIG. 1—an edge boundary wire 2 is used, onto which electrical signals are sent by a transmission unit 5, the communication of the individual ground working devices 1.1, 1.2, 1.3 and 1.4 with the base station 8 may also take place via the edge boundary wire 2. The operating variable B may be distributed by the transmission unit 5 via the edge boundary wire 2 to the system S. The system S may also be configured in such a way that status information items of the ground working device are transmitted via a transmission coil in a ground working device via the edge boundary wire to the base station 8. The transmission unit 5 is then expediently configured as a transmission/reception unit.

It is understood that the foregoing description is that of the preferred embodiments of the invention and that various changes and modifications may be made thereto without departing from the spirit and scope of the invention as defined in the appended claims.

What is claimed is:

1. A method for setting up and operating a system having a plurality of self-driving lawn mowers; the method comprising:
   transmitting information about at least one operating variable (B) from at least one of the plurality of self-driving lawn mowers to other ones of the plurality of self-driving lawn mowers for setting up and initiating the system;
   wherein the at least one operating variable (B) includes at least one of a start time of the operation, a duration of the operation, a cutting height, a traveling distance to a charging station, and a mowing schedule;
   wherein information about the at least one operating variable (B) for operating a corresponding one of the self-driving lawn mowers is stored in a memory of the corresponding one of the self-driving lawn mower;
   wherein the information about the at least one operating variable (B) is inputted and transmitted via an input field on an external input device, wherein the external input device communicates wirelessly with a base station and transmits items of the information relating to the at least one operating variable (B) which have been entered manually on the external input device;
   wherein a program, including a user app, is stored in the external input device via which the items of the information relating to the at least one operating variable (B) is entered;
   wherein a wireless radio link between the external input device and the system may be a WLAN radio connection, a Bluetooth radio connection, an NFC (Near Field Communication) radio connection, or a GSM radio connection for transmitting data;
   wherein the external input device is a mobile terminal including a tablet PC, a smartwatch, or a smartphone;
   driving one of the plurality of self-driving lawn mowers autonomously along a random path (W) within an operating region (A) independently of another one of the plurality of self-driving lawn mowers while utilizing the at least one operating variable (B);
   adapting a behavior of an individual self-driving lawn mower in dependence upon changes of the at least one operating variable (B) during the operation of the system of self-driving lawn mowers; and,
   adapting the at least one operating variable (B) of one of the plurality of the self-driving lawn mowers in dependence upon a reported operating status of another one of the plurality of self-driving lawn mowers into an adapted operating variable (B'), whereby the adapted operating variable (B') adapted by the base station is wirelessly transmitted to individual ones of the plurality of self-driving ground lawn mowers operating in the system.

2. The method of claim 1, further comprising inputting the information about the at least one operating variable (B) via an input field of one of the plurality of the self-driving lawn mowers.

3. The method of claim 1, further comprising inputting the information about the at least one operating variable (B) via the input field on the base station.

4. The method of claim 1, further comprising an individual one of the plurality of self-driving lawn mowers reporting a current operating status of the corresponding self-driving lawn mowers to the base station.

5. The method of claim 1, further comprising:
   transmitting the adapted operating variable (B') to the other ones of the plurality of self-driving lawn mowers; and,
   storing the transmitted adapted operating variable (B') in the respective memories of the other ones of the plurality of self-driving lawn mowers for further processing by a corresponding control unit.

6. The method of claim 1, wherein the operating region (A) is delimited by an edge boundary wire.

7. The method of claim 6, wherein:
   the base station of the system is electrically connected to the edge boundary wire and is configured to output a wire signal onto the edge boundary wire;
   an electromagnetic field of the wire signal is configured to induce a receiving signal in a reception coil; and,
   a control unit processes the receiving signal for controlling the self-driving lawn mower.

8. A method for setting up and operating a system having a first self-driving lawn mower and a second self-driving lawn mower for combined working in a predetermined operating region (A) and a base station, the method comprising:
   transmitting information about an operating variable (B) from the first self-driving lawn mower to the second self-driving lawn mower for setting up and initiating the system, wherein the operating variable (B) includes at least one of a start time of the operation, a duration of the operation, a cutting height, a traveling distance to a charging station, and a mowing schedule;
   driving the first self-driving lawn mower autonomously along a random path (W) within the operating region (A) independently of the second self-driving lawn mower while utilizing the operating variable (B);
   repeatedly transmitting an operating status of the first self-driving lawn mower and of the second self-driving lawn mower to the base station;
   adapting the operating variable (B) via the base station in dependence upon the transmitted operating statuses into an adapted operating variable (B');
   transmitting the adapted operating variable (B') wirelessly to the first self-driving lawn mower and the second self-driving lawn mower; and,
   adapting a behavior of at least one of the first self-driving lawn mower and the second self-driving lawn mower on a basis of the adapted operating variable (B') during operation of the system.

9. The method of claim 8, wherein the information about the operating variable (B) for operating a corresponding one of the self-driving lawn mowers is stored in a memory of the corresponding one of the self-driving lawn mower.

10. The method of claim 9, wherein the information about the operating variable (B) is inputted and transmitted via an input field on an external input device, wherein the external input device communicates wirelessly with a base station and transmits items of the information relating to the operating variable (B) which have been entered manually on the external input device.

11. The method of claim 10, wherein a program, including a user app, is stored in the external input device via which the items of the information relating to the operating variable (B) is entered.

12. The method of claim 11, wherein a wireless radio link between the external input device and the system may be a WLAN radio connection, a Bluetooth radio connection, an NFC (Near Field Communication) radio connection, or a GSM radio connection for transmitting data.

13. The method of claim 12, wherein the external input device is a mobile terminal including a tablet PC, a smartwatch, or a smartphone.

\* \* \* \* \*